United States Patent [19]

Plasek et al.

[11] Patent Number: 5,699,246
[45] Date of Patent: Dec. 16, 1997

[54] METHOD TO ESTIMATE A CORRECTED RESPONSE OF A MEASUREMENT APPARATUS RELATIVE TO A SET OF KNOWN RESPONSES AND OBSERVED MEASUREMENTS

[75] Inventors: Ronald E. Plasek, Houston; Christian Stoller, Kingwood; Robert A. Adolph, Houston, all of Tex.

[73] Assignee: Schlumberger Technology Corporation, Houston, Tex.

[21] Appl. No.: 532,133

[22] Filed: Sep. 22, 1995

[51] Int. Cl.⁶ .............. E21B 49/00; G01V 1/28; G01V 1/30; G01V 1/32
[52] U.S. Cl. .......... 364/422; 73/152.02; 73/152.54; 175/50; 250/253; 324/323; 324/332; 340/853.1
[58] Field of Search ............ 73/152.02, 152.54; 175/50; 250/253, 254, 256, 269.4; 324/323, 332, 333; 340/853.1; 364/422

[56] References Cited

U.S. PATENT DOCUMENTS

| | | | |
|---|---|---|---|
| 4,600,838 | 7/1986 | Steinman et al. | 250/270 |
| 4,712,424 | 12/1987 | Herron | 73/152.14 |
| 4,721,853 | 1/1988 | Wraight | 250/269 |
| 4,722,220 | 2/1988 | Herron | 73/152.14 |
| 4,773,264 | 9/1988 | Herron | 73/152.05 |
| 4,831,530 | 5/1989 | Rai | 364/421 |
| 4,909,075 | 3/1990 | Flaum et al. | 73/152 |
| 5,055,676 | 10/1991 | Roscoe et al. | 250/270 |
| 5,086,224 | 2/1992 | Roscoe et al. | 364/422 X |
| 5,251,286 | 10/1993 | Wiener et al. | 395/22 |
| 5,420,422 | 5/1995 | Loomis | 250/269.4 |
| 5,638,269 | 6/1997 | Fournier et al. | 364/422 |

OTHER PUBLICATIONS

R.E. Plasek, R.A. Adolph, C. Stoller, D.J. Willis, E.E. Bordon and M.G. Portal; "Improved Pulsed Neutron Capture Logging with Slim Carbon–Oxygen Tools: Methodology", SPE Annual Technical Conference & Exhibition, Dallas, Texas, Oct. 22–25, 1995. (SPE 30598).

P.R. Bevington; "Multiple Linear Regression"—Data Reduction and Error Analysis for the Physical Sciences, McGraw–Hill, 1969. p.164.

Primary Examiner—Edward R. Cosimano
Attorney, Agent, or Firm—Brigitte L. Jeffery; Darcell Walker; John J. Ryberg

[57] ABSTRACT

The present invention provides a new method to determine corrected characteristics of materials using the measured quantities obtained by a measurement and an extensive set of database points representing laboratory and modeled results in well defined environments. In particular the invention relates to the measurement of the characteristics of the formation around a wellbore as well as of the borehole with a well logging tool. Using a dynamic parametrization technique, the environmental corrections and the transformations from the measured to the physical characteristics can be achieved in a more accurate, robust and flexible way. The dynamic local parametrization is based on a weighted multiple linear regression over the entire database to obtain the local coefficients for the transformation which can be expressed as a simple equation.

37 Claims, 7 Drawing Sheets

METHOD TO ESTIMATE A CORRECTED RESPONSE OF A MEASUREMENT APPARATUS RELATIVE TO A SET OF KNOWN RESPONSES AND OBSERVED MEASUREMENTS

FIELD OF THE INVENTION

This invention relates to a method for determining the characteristics and features of materials while correcting for environmental effects. In particular, the invention relates to a method of correcting logging tool measurements affected by environmental effects and a method for transforming observed (measured) quantities into physical parameters of the wellbore and earth formation.

BACKGROUND OF THE INVENTION

Most logging tool measurements are affected by well-known "environmental effects" which cause the observed tool measurement to differ from the true physical value. In nuclear logging for example, the time decay-measurement of a pulsed neutron capture tool, which is characteristic of a physical parameter in a formation, is different in the same formation when there is a variation in parameters such as borehole size, casing size and weight, and borehole fluid. Hence, "environmental correction" algorithms are needed in order to correct for these variable perturbations and to determine the true characteristic parameter of the formation.

Furthermore, some measured values such as count rate ratios are indirect indicators of characteristics of the formation or the wellbore. In this case a mathematical transformation is needed in addition to the environmental corrections.

The environmental corrections and the transformations can be illustrated with the example of pulsed neutron capture (PNC) logging. In this measurement the formation is irradiated by bursts of high energy neutrons (typically 14 MeV). These neutrons are slowed down by collisions with nuclei in the formation and the borehole. The slow (thermal) neutrons are then, over a period of time, captured by formation and borehole nuclei (neutron capture) or they diffuse out of the detection range of the detectors (neutron diffusion). The capture of the neutrons is accompanied by the emission of gamma rays, which are detected in the logging tool. The decline of the gamma ray counts with time is primarily a measure of the salinity of the formation fluid and the borehole fluid. The absence of saline formation water is often an indicator of the presence of hydrocarbons, which do not contain NaCl. The decline of the gamma ray intensity is often reported in terms of a thermal neutron capture cross section as opposed to a decay time. In summary, in pulsed neutron capture logging (PNC) the measured (apparent) capture cross section needs to be corrected through environmental corrections to obtain the true formation thermal neutron capture cross section (Sigma ($\Sigma$)).

In addition, if the tool uses two or more detectors, the ratio of the number of counts of one detector to the counts of another detector can be determined. This ratio is a strong function of the porosity of the formation. However, in this case because a ratio is not in porosity units, a mathematical transformation is needed to convert the ratio into porosity or hydrogen index. For example, a near-to-far detector count-rate ratio from a neutron tool requires a mathematical transformation to convert the ratio into porosity, in addition to an environmental correction. Similarly, an apparent borehole cross-section measurement from a pulsed neutron capture tool requires a mathematical transformation to convert it to the actual salinity of the borehole fluid in addition to an environmental correction.

$\Sigma$ is inferred from the observed decline in the gamma ray count rate versus time. However, in addition to neutron capture, two key environmental effects contribute to the observed decay rate: diffusion and the so-called "borehole contamination." These effects should be carefully characterized in order to determine the correct $\Sigma$ throughout the wide range of operating conditions typically encountered in the oilfield. These effects ar functions of environmental parameters which include borehole size, casing size, casing weight, borehole fluid salinity, porosity and lithology. Some approaches to handle these environmental effects have been described in past publications and are already known.

The classical approach to handling both mathematical transformations and environmental effects has been to acquire (measure and/or model) a large database spanning all the various environmental parameters of interest and then to "parameterize" the transformations and environmental corrections that are needed. This action requires developing specific equations with fixed coefficients which are then "hard-coded" into algorithm software.

The equations are derived in a laboratory environment from known "true values" of a particular formation and the measured (apparent) values. These two sets of values for a particular parameter are plotted versus each other and a curve of the plot is generated. An equation is generated from the plotted curve that corrects the measurement for the effects a of specific parameter.

This current approach logs with a typical fixed-coefficient algorithm that has two types of inputs:

1) the environmental parameters (lithology, borehole size, etc.) and 2) the observed or "apparent" quantities (like apparent sigmas, near/far ratios, etc.).

At each depth level, the fixed-coefficient algorithm computes the true (calibrated and environmentally-corrected) quantity from the measured quantities. This method is used in many of today's logging tools.

Unfortunately, many of these transformations and environmental effects are difficult to account for and cannot readily be cast into direct analytical models that are simple and physical, yet accurate and robust over the entire range of logging conditions. The equations can become very complex, cumbersome and difficult to visualize due to their multi-dimensional nature. Complex analytical models can be unstable outside the characterized range, whereas simple models may not adequately correct for all the environmental effects.

Accordingly, since these effects are difficult to account for in direct analytical approaches over the entire range of oilfield conditions, the present invention has developed a dynamic parametrization technique, based on an extensive set of laboratory and/or modeled data, to provide accurate environmentally corrected answers. This methodology meets the requirement that the model be simple, accurate and robust, and that it be well behaved outside the database range. The methodology can be applied to a very wide variety of measurements to perform mathematical transformations and environmental corrections.

SUMMARY OF THE INVENTION

A multidimensional "dynamic parameterization" technique has been developed, applied and refined. The technique bases the parameterization on an extensive set of database points obtained by experiments and/or modeling.

This technique keeps the order of parameters low, and as a result, the response is predictable and well-behaved both inside and outside the range spanned by the database. The supporting database for the logging measurement spans the range of possible formation, borehole and other environmental parameters relevant for the measurement in question. The number of points needed is a function of the number of environmental parameters influencing the measurement and also a function of the complexity and number of the environmental effects.

The method of this invention uses "dynamic parameterization" at each depth level logged instead of a fixed-coefficients parameterization. It is multi-dimensional and it simultaneously handles both the mathematical transformations and the corrections for the multiple environmental effects affecting the measurement. To assist the reader, throughout the remainder of the document the following definitions will be used:

The adjectives "true" or "assigned" denote the true value of the characteristic which is being investigated.

The adjectives "raw", "observed", "apparent", or "measured" denote the result of the measurement before some or all corrections for environmental effects are applied and before all transforms are carried out.

The method uses 3 sets of inputs:

1) the environmental parameters (lithology, borehole size, etc.)

2) the raw measured quantities (such as near/far ratios) and 3) the actual database.

The database is conceptualized as being a table having n rows (different measurements or modeled points) by k columns, the columns containing, for each row: a) the raw measured quantities and, b) their corresponding environmental parameters and, c) the corresponding true quantities (e.g. true formation sigma, true formation porosity, etc.). Therefore, for each logging measurement (at each level in the well) the method "dynamically parameterizes" the response equations based on the proximity of the raw measured quantities to the nearest neighbors in the database. It then applies these parametrized equations, and computes transformed and environmentally corrected results. These particular equations are then discarried and the process repeats at the next level in the borehole which is typically 6 inches from the previous measurement.

The selection of the "nearest neighbors" mentioned above is done in a weighted sense rather than in a binary "on/off" way. The value of the weight is determined by how "close" the present measurement lies to each point in the database. This distance is measured in all dimensions of the problem (e.g., for a PNC tool such dimensions might include: sigma, porosity, borehole salinity, casing/borehole inner diameter, casing thickness, cement thickness). It should be noted that this method is very general and is not unique to a specific logging tool or logging measurement.

In addition, the method does not necessarily have to use only laboratory points in its database. This method can also use modeled points. FIG. 1 shows the "nearest neighbor" approach in a 3-dimensional representation. The database points (open circles) are positioned according to 3 parameters. The measured point M is shown as a filled circle and is also positioned with respect to the same parameters. The nearest neighbors' distances are indicated by vectors. A weighted multiple linear regression (WMLR) is then used to determine the coefficients of the equations for the dependent quantities in this space. Applying these coefficients in the equations one finds the best match for the dependent (unknown) quantities for the measured point.

In this invention, the database would be as follows:

| Database entry | Y | $X_1$ | $X_2$ | $X_3$ ... | $X_k$ |
|---|---|---|---|---|---|
| Measurement 1 | $Y_1$ | $X_{11}$ | $X_{21}$ | $X_{32}$ ... | $X_{k1}$ |
| Measurement 2 | $Y_2$ | $X_{12}$ | $X_{22}$ | $X_{32}$ ... | $X_{k2}$ |
| . | . | . | . | . | . |
| . | . | . | . | . | . |
| Measurement n | $Y_n$ | $X_{1n}$ | $X_{2n}$ | $X_{3n}$ ... | $X_{kn}$ |

As depicted above, the database has n database measurements, each of which has stored the true value ($Y_i$) of the measured quantity (for example, the salinity of the borehole fluid) along with the measured (apparent) quantities (for example the decay time) and all the environmental parameters (like borehole size) which are needed to describe the measurement. These measured quantities and environmental parameters are denoted by the X's. There are k of these apparent and environmental parameters for each true value $Y_i$.

The true value Y is known as the "dependent" variable (or "response" variable in statistical theory) and the X's are known as the "independent" variables (or "regressors" in statistical theory). Only one column of Y's is shown above, but there are typically several for a given logging measurement (for example borehole salinity, true formation porosity and true formation sigma).

In this invention, the dependent (true) quantity Y can be expressed as a simple linear function of the k independent quantities X when in the neighborhood of Y as follows:

$$Y = b_0 + b_1^* X_1 + \ldots + b_k^* X_k \tag{1}$$

Each $X_i$ term is not limited to just $X^1$ power but could be $X^z$, z being some higher power; in addition each $X_j$ term could represent the cross-product of several X-terms or even products of powers of different $X_j$-terms or any function of $X_j$-terms. For simplicity of presentation, just $X^1$ terms will be shown. However, a requirement of the method is that the equation remains linear with respect to the coefficients $b_j$ in the neighborhood of the measurement.

A measurement M is represented as the vector $m_1, m_2, \ldots m_k$, of the k independent variables. This could for instance be the measurement at one given depth in a well. Thus, the value of the dependent variable can be predicted (call its predicted value "ŷ") from the current measurement M as:

$$\hat{y} = b_0 + b_1^* m_1 + b_2^* m_2 + \ldots + b_k^* m_k \tag{2}$$

provided the coefficients $b_i$ can be determined. As previously mentioned, in fixed-coefficient environmental correction algorithms, the coefficients $b_i$ would simply be a set of fixed numbers in the algorithm software. However, in the present invention, the coefficients are computed for each measurement (at each level logged) by employing a weighted multiple linear regression technique, referred to as "WMLR", incorporating all n database measurements.

The present invention contains a database having an over-determined set of equations, typically several hundred equations (n), but only approximately one-half dozen independent variables (k). The weighting, a critical part of the new methodology, emphasizes database points with measured quantities ($X_j$) that are "close to" those at the measured point (M) by weighting them heavily and de-emphasizes database points that are "far away from" the measured point M by weighting them lightly. In general, it does this in a smoothly-varying manner—not in a binary "on/off" fashion. Thus the parametrization at each depth can be thought of as being determined from the gradient through the M's "nearest neighbors".

The solution for the $b_j$ in the equation $\hat{y}=b.X$ is given, in matrix mathematical notation, by $$b=(Xt.W.X)^{-1}.Xt.W.Y \quad (3)$$

Where "." represents matrix multiplication, "t" represents the matrix transpose, $^{-1}$ represents the matrix inverse, X is the matrix of independent variables (n by k), W is the matrix of n weights (diagonal n by n) and Y is the matrix of the dependent variables (n by 1). References for this solution can be found under the topic "Multiple Linear Regression" in any of a variety of texts on statistics, for example, Data Reduction and Error Analysis for the Physical Sciences, P. R. Bevington, McGraw-Hill, 1969, p.164. Hence, the corrected value of the dependent variable, denoted by $\hat{y}$, can be computed, since both the b's and the m's are known by:

$$\hat{y}=b_0+b_1{}^*m_1+\ldots+b_k{}^*m_k \quad (4)$$

In summary for each measurement (depth level logged) the following is done:

1) The distances between the measured point and all n database points are calculated and weights determined (high weights for close points, low weights for distant points).

2) The resulting n equations of the form of eqn. 1 along with their weights are put into a WMLR solving for the b's (eqn. 3).

3) The measured point and the b's are combined to produce the answer $\hat{y}$ using eqn (4).

Optionally, at each depth level, the three-step WMLR-based sequence described above may be repeated to further refine the answers (improve accuracy). For example, in a subsequent pass, a second (different) data-base is used wherein the apparent quantities (for example, apparent far detector formation sigma, near-to-far count rate ratio, etc.) are replaced with the corrected quantities (for example, corrected far detector formation sigma, porosity, etc.). These corrected data-base values are obtained by processing the original data-base apparent quantities through a single WMLR pass. Additionally, the measurement "m" in equation 4) is replaced with the results (the $\hat{y}$'s) obtained from the first WMLR pass. In other words, during a second pass the WMLR works at removing any residual errors remaining after just one WMLR pass. This process may, in principle, be carried out multiple times.

The n weights are computed based on how far the measurement M is from each database point, i.e., a distance $d_i$ is computed for each database point, i=1 ... n. The weight, $W_i$ is then computed as $W_i=F(d_i)$. An example of F, for this invention is $W_i=2^{-di}$.

For each given database point i, distance di is computed as $$d_i=(sum\ j=1\ to\ k)\ of\ [abs((m_i-X_{ji})/S_j)]$$

where "abs" indicates the absolute value function and where $S_j$ is a "step size" factor which normalizes the distances for the various X's. The step size factors, which define the "unit distance" in each dimension, are needed since the X's are typically different kinds of quantities and are in different units systems. For example, one X may be formation apparent sigma, which ranges typically between 5 and 50 capture units. By contrast, another X may be borehole size which typically ranges between 6 and 12 inches. In practice, $S_j$ should be set at approximately the step size encountered in the database. It should be noted that the exact formulation of the weighting scheme is not critical. For example, other weighting schemes can also be used such as $$d_i=max\ (d_i,\ min\_distance)$$

or $W_i=d_i^{-2}$, where $d_i^{-2}=sum(j=1\ to\ k)\ of\ [((m_i-X_{ji})/S_j)^2]$ and the minimum distance is set to some small fraction of unit distance (0.1, 0.2, 0.3, etc.) so as to keep the weight from becoming inordinately large or even undefined.

In another embodiment the weights can be assigned in a binary way as either 1 or 0 depending on the distance $d_i$ $W_i=1.0$ if $d_i<$min-distance $W_i=0.0$ if $d_i\geq$min-distance and min_distance is some finite normalized distance. Estimates of the precision (standard deviation) of the $\hat{y}$'s at each depth can be made as shown below.

$$Var[\hat{y}]=b_1{}^{2*}Var[X_1]+\ldots+b_k{}^{2*}Var[X_k]$$

$Std_{13}Dev[\hat{y}]=sqrt(Var[\hat{y}])$ indicates the standard deviation.

This relationship holds provided that the X's are statistically independent. In the case of non-independent terms, partial derivatives are needed. In the hypothetical example below $\hat{y}$ is derived from both a linear and a quadratic $X_1$ term:

$$\hat{y}=b_0+b_1{}^*X_1+b_2{}^*X_1{}^2+\ldots$$

The variance is given by $VAR[\hat{y}]=(d\hat{y}/dX_1)^{2*}VAR[X_1]+\ldots$ where $d\hat{y}/dX_1$ is the partial derivative of $\hat{y}$ with respect to $X_1$.

The dynamic parametrization method provides several advantages not presently available with any other method. In addition to being more accurate, it is very robust (well-behaved) primarily since it typically needs only low order correction and transformation functions (linear or at most quadratic). Also, additional points can be added to the database without the need to reparameterize, which would arise for a fixed coefficients method. Other environmental effects, not presently used in some tools, can be easily and straightforwardly added (e.g. tool standoff). Non-independent (i.e. coupled) environmental effects are handled automatically. Special cases which in the past could only be addressed by manual intervention (changing the algorithm based on expert knowledge) are handled automatically (An example of this is the case of "crossover" in PNC logging. In this case the formation sigma is larger than the borehole sigma, whereas in most situations the converse is true. Traditional interpretation requires that an expert recognize this situation and that he manually intervene in the software to address the situation.). The method can transform a given tool's response into the response of a prior tool, making "backwards compatible" outputs. This is done by including the response of both tools in the database, declaring the new tool's response to be "measured" and declaring the prior tool's response to be "truth". The method with appropriately modified weights, can be used to "model" missing data points (for example, where formation availability is prohibited by cost, storage requirements, etc.). The method can also be used to attempt to predict borehole parameters, such as borehole size and casing inner diameter. These parameters can be useful in detecting borehole anomalies such as washouts behind casing, or hardware changes not otherwise documented on the logs. This means that some of the environmental parameters which are normally input into the equation can be changed to dependent variables and solved. This allows to verify the validity of environmental parameters used in the analysis. Conversely, if additional information is known (for example borehole salinity or formation porosity) it can be entered into the computation and the number of dependent variables can be reduced, further improving accuracy and robustness.

DESCRIPTION OF THE PREFERRED EMBODIMENT

Figure 2:
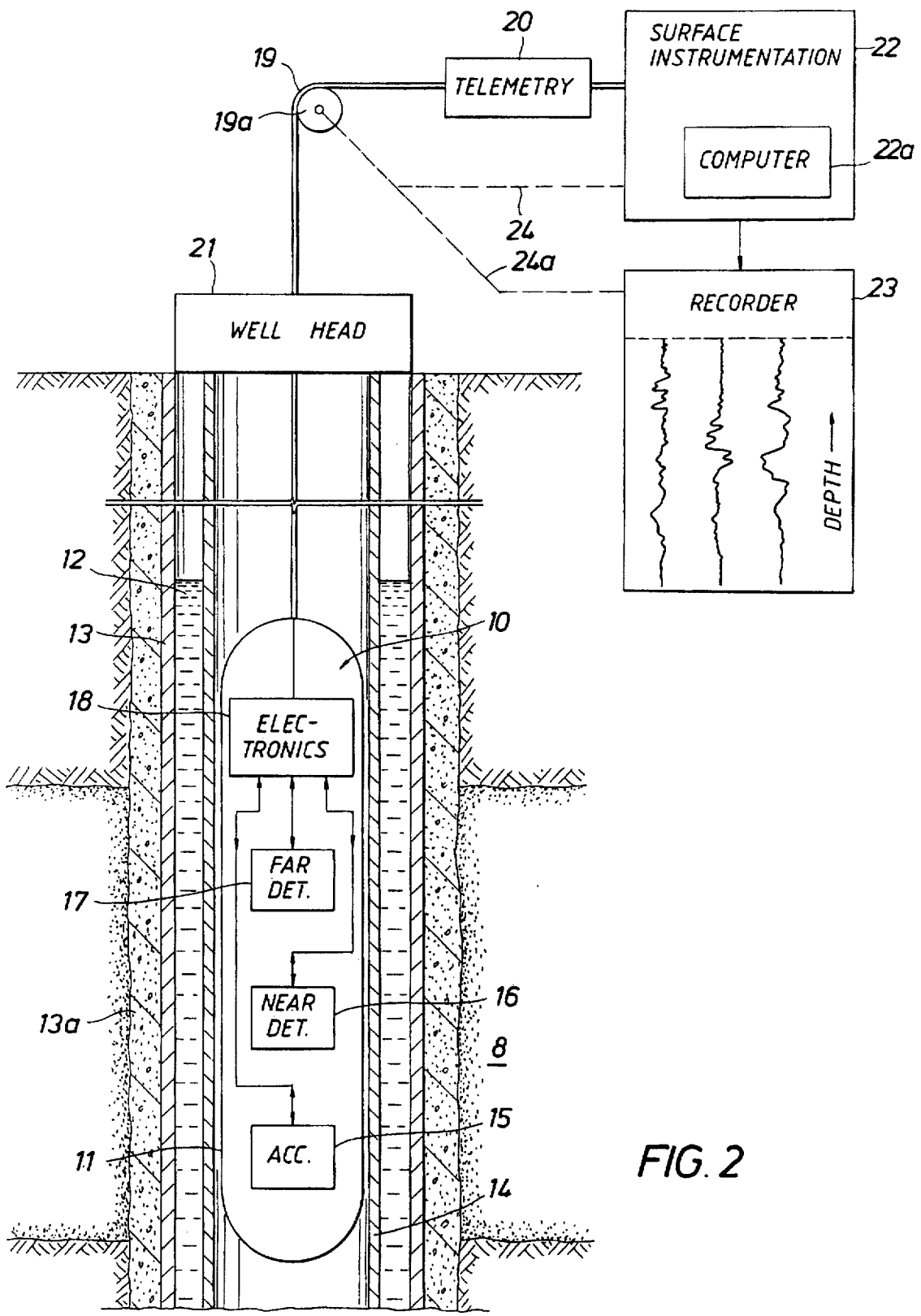
FIG. 2 is a diagram of a logging tool using the present invention

The present invention can be carried out using a logging tool similar in most respects to those described and shown in U.S. Pat. No. 5,055,676 (Roscoe et al, Oct. 8, 1991), which is hereby incorporated herein by reference, or any similar tool. As shown in FIG. 2, an embodiment of the tool (or sonde) is placed in a well bore 12 that transverses an earth formation 8. The sonde 10 includes a housing 11 in the shape of a cylindrical sleeve, which is designed for running through either small or large diameter production tubing. Although not illustrated in FIG. 2, the sonde 10 may also have an eccentering device, for forcing the tool against well casing beneath the bottom end of tubing 14. Accelerator or pulsed neutron source 15 is mounted in the sonde with near detector 16 and far detector 17 mounted longitudinally above the accelerator 15, with increasing axial distances. Acquisition, control and telemetry electronics 18 serves among other functions, to control the timing of burst cycles of the neutron accelerator 18, the timing of detection time gates for near and far detectors 16, 17 and to telemeter count rate and other data via cable 19 and telemetry circuitry 20 to surface instrumentation 22 which includes computer 22a. Computer 22a receives gamma ray spectral data from near and far detectors 16 and 17. The signal may be recorded as a function of depth on recorder 23. The schematic illustration of FIG. 2 shows applications of the tool using tubing 14 in the well bore 12 which typically is lined with steel casing 13 and cemented 13a in place through formations 8. Well head 21 at the earth's surface communicates with tubing 14. Sheave wheel 19a is shown schematically as controlling the movement of sonde 10 through tubing 14. The depth of the sonde 10 within well bore 12 is measured by encoders associated with sheave 19a as indicated by dotted lines 24, 24a from sheave 19a to computer 22 and recorder 23.

Figure 1:
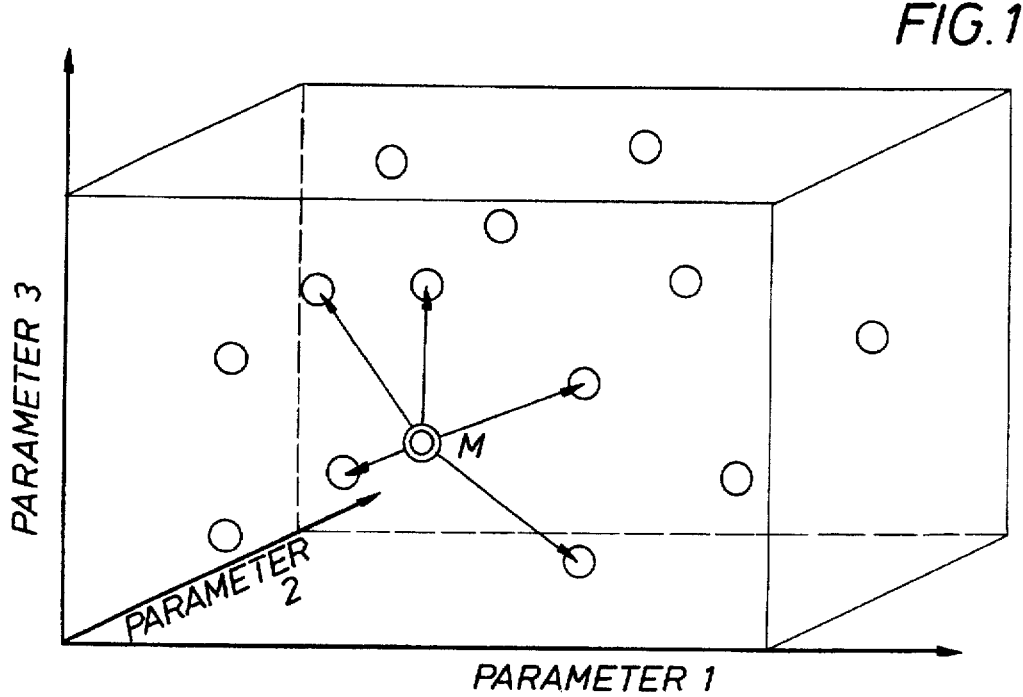
FIG. 1 is a simplified diagram of a measured data point in a database and the known data points in the database showing the proximate location of the measured data point from the known data points. The vectors point to the nearest neighbors (heavily weighted points).
Figure 4:
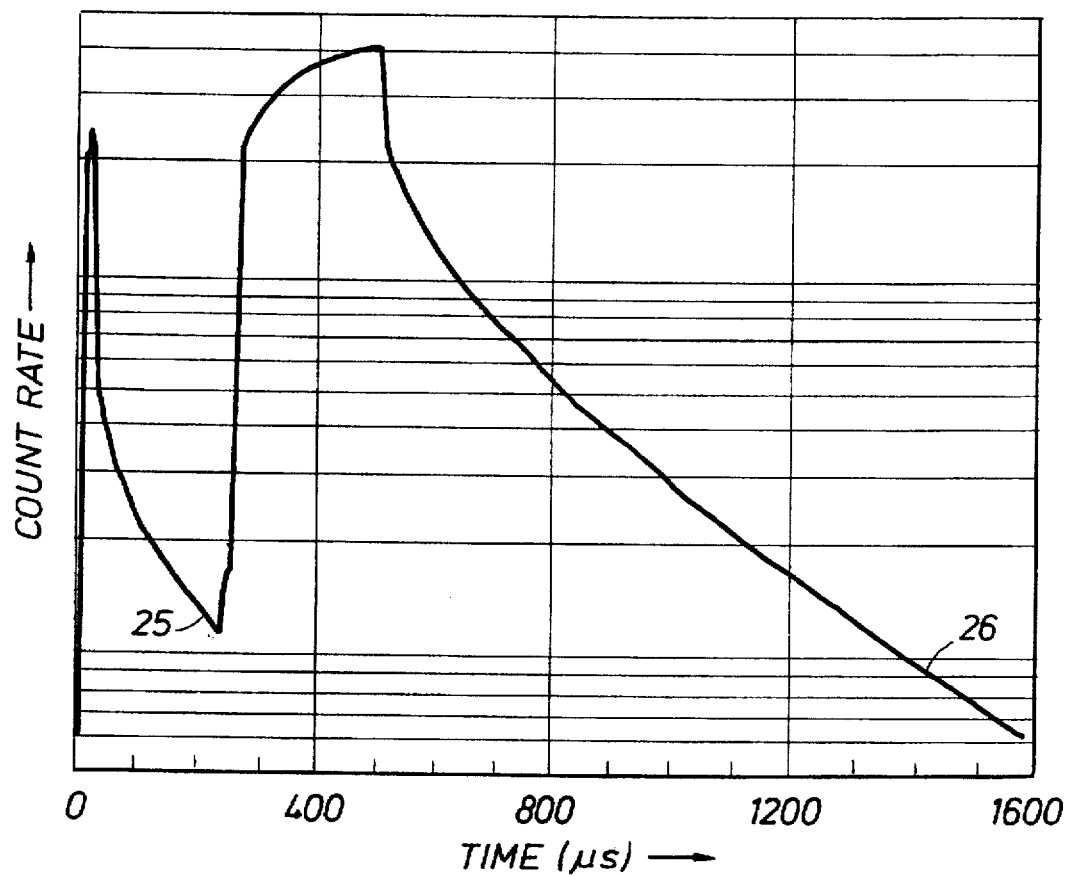
FIG. 4 shows a typical PNC dual-burst time decay spectrum.

This invention uses thermal neutron capture gamma ray decay time measurements to compute observed tool quantities. These decay times are measured using a Dual-Burst thermal decay logging method. This basic method is described in U.S. Pat. No. 4,712,853 which is incorporated by reference. In this method, a neutron burst sequence is provided which includes two bursts designated as a short burst and a long burst. A first short time burst of fast neutrons is provided at a location in the borehole thereby irradiating borehole materials and the earth formation adjacent to that borehole location. The gamma ray intensity indicative of the concentration of thermal neutrons in the formation and borehole materials is measured after the short burst. Next, a relatively long time burst of fast neutrons is applied at substantially the same location within the borehole thereby again irradiating the borehole materials and the earth formation adjacent the borehole location. FIG. 4 shows a typical dual-burst time decay spectrum. The decay time after the short burst is measured during the interval 25 and used to determine the apparent borehole sigma. The decay time after the long burst is measured during the interval 26 and used to determine the apparent formation sigma. The near-to-far count rate ratio is also computed.

Subsequently, based on an extensive measured and modeled database, these quantities are transformed into true (corrected) quantities such as formation thermal neutron capture cross section, formation porosity and borehole fluid mixture salinity.

As stated, a database containing measured and modeled data points is used in the transformation and environmental correction of apparent quantities. Table 1 below is an example of a very extensive PNC database which contains data characterizing tool performance over a wide range of circumstances. These measurements are derived from laboratory measurements in known earth formations. The tools were run in over thirty different laboratory formation tanks, while varying the salinity of both the formation and borehole fluids as well as inserting different cemented casing completions into the boreholes.

TABLE 1

| LIST OF DATABASE POINTS | | | | | | |
|---|---|---|---|---|---|---|
| Hole | Casing | | | | Formation | |
| Size (in.) | Size (in.) | Weight (lbm/ft) | Lithology[1] | Porosity[2] | Flush[3] (kppm NaCl) | Borehole Fluid[4] (kppm NaCl) |
| 6 | Open | hole | L S D | Z* M H | 0 70 140 210 | 0 25 50 100 200 Air |
| 6 | 4.5 | 10.5 | L S D | Z* M H | 0 70 140 210 | 0 25 50 100 200 Air |
| 6 | 5.0 | 18 | L S D | Z* M H | 0 70 140 210 | 0 25 50 100 200 Air |
| 8 | Open | Hole | L S D | Z* M H | 0 70 140 210 | 0 25 50 100 200 Air |

TABLE 1-continued

LIST OF DATABASE POINTS

| Hole | Casing | | | | Formation | | | |
|---|---|---|---|---|---|---|---|---|
| Size (in.) | Size (in.) | Weight (lbm/ft) | Lithology[1] | Porosity[2] | Flush[3] (kppm NaCl) | | Borehole Fluid[4] (kppm NaCl) | |
| 8 | 5.5 | 15.5 | L S D | Z* M H | 0 70 140 210 | | 0 25 50 100 200 Air | |
| 8 | 7.0 | 32 | L S D | Z* M H | 0 70 140 210 | | 0 25 50 100 200 Air | |
| 10 | 5.5 | 15.5 | L S D | Z* M H | 0 70 140 210 | | 0 25 50 100 200 Air | |
| 10 | 7.0 | 32 | L S D | Z* M H | 0 70 140 210 | | 0 25 50 100 200 Air | |
| 10 | 7.625 | 26.4 | L S D | Z* M H | 0 70 140 210 | | 0 25 50 100 200 Air | |
| 12 | 7.625 | 26.4 | L S D | Z* M H | 0 70 140 210 | | 0 25 50 100 200 Air | |
| 12 | 9.625 | 32.3 | L S D | Z* M H | 0 70 140 210 | | 0 25 50 100 200 Air | |
| 12 | 9.625 | 53.5 | L S D | Z* M H | 0 70 140 210 | | 0 25 50 100 200 Air | |

[1]L = Limestone S = Sandstone D = Dolomite
[2]Z = zero (0 p.u.) M = medium (15 to 20 p.u.) H = high (33 p.u for sand, 38 to 43 p.u. in lime and dolomite)
[3]For sand the 70 and 210 kppm points are modeled, for dolomite 70 and 210 kppm are omitted.
[4]For sand the 25 and 100 kppm points are modeled, for dolomite 25 and 100 kppm are omitted.
*)These 0 p.u. points are modeled for sand.

Well over 1000 different formation/borehole conditions were measured. For example, the limestone database consists of measurements in the following permutations of formation and borehole conditions: four borehole sizes, three completions (varying casing size, casing weight and cement annulus), three porosities, four formation flushes of varying salinity, six different borehole fluids (five varying salinities plus air). Referring to Table 1, the characteristics of a database point could be: 6 inch holesize, 4.5 inch casing size, 10.5 lbm/ft casing weight, sandstone lithology, 17 p.u. porosity, 70 kppm NaCl formation flush and 50 kppm NaCl borehole fluid.

The capture cross sections ($\Sigma$) of the database formations are calculated classically as:

$$\Sigma = (1-\phi)\Sigma_{ma} + \phi S_{fl} \Sigma_{fl} \quad (5)$$

where $\phi$ is the formation porosity, $\Sigma_{ma}$ is the matrix capture cross section ("sigma-matrix"), $S_{fl}$ is the formation fluid saturation, and $\Sigma_{fl}$ is the formation fluid capture cross section ("sigma-fluid").

Equivalence between $\Sigma$, and decay time $\tau$ is made using the familiar conversion equation:

$$\Sigma = \frac{1}{v\tau} = \frac{4545}{\tau}, \quad (6)$$

where normally $\Sigma$ is in capture units (1 capture unit=0.001 cm$^{-1}$), $\tau$ is in microseconds (μs), and v is the accepted thermal neutron velocity at room temperature (2200 m/s).

Figure 3:
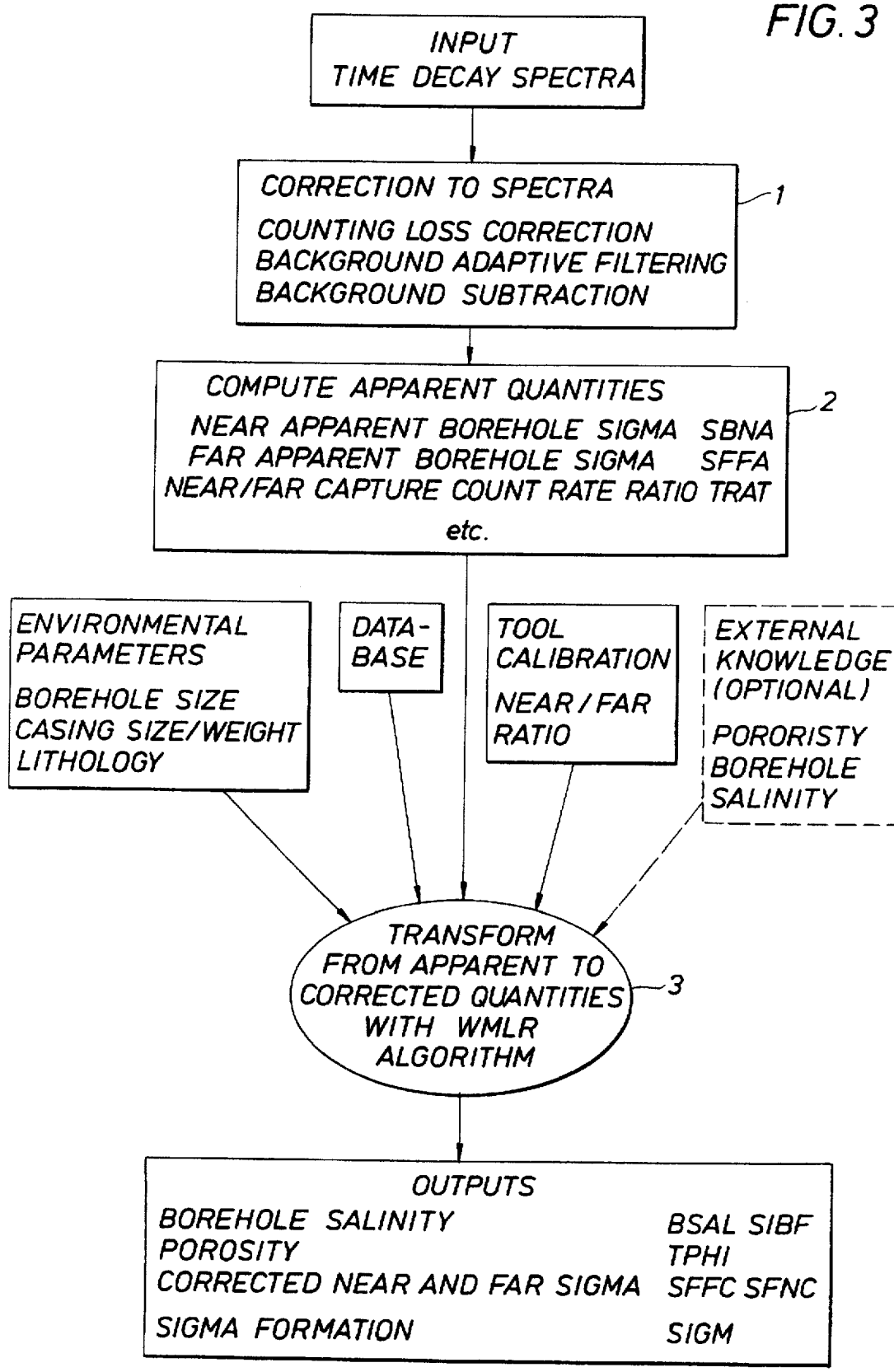
FIG. 3 is a flow diagram of the algorithm that transforms observed (apparent) to corrected (true) quantities in the present invention.

Referring to FIG. 3, the present invention can be visualized as a three-step sequence: 1) corrections to the time-decay spectra; 2) calculation of observed quantities; and 3) transformation of observed quantities into corrected quantities.

In step 1 of the present invention, measured counting losses and background counts are used to correct the near- and far-detector time-decay spectra. To improve statistical precision the background is typically averaged (filtered) over several levels, typically five feet. Adaptive filtering selectively shrinks the filter length to properly handle "hot spots" resulting from radioactive scale, radioactive markers, activated casing, check sources, etc.). In this step, background radiation is subtracted from the spectra. In addition, this step accounts for and corrects for pile-up events (counting losses when two gamma rays are detected and counted as one gamma ray because they arrive almost simultaneously at the detector).

In step 2, the corrected time-decay spectra are processed to generate quantities such as decay times, their equivalent sigmas (see eqn. 6) and count rate ratios. Three of these observed (apparent) quantities: apparent near borehole sigma (SBNA), near-to-far capture ratio (TRAT), and apparent far formation sigma (SFFA) form the basis for the corrected tool outputs borehole fluid salinity (BSAL), porosity (TPHI) and formation sigma (SIGM).

Figure 5:
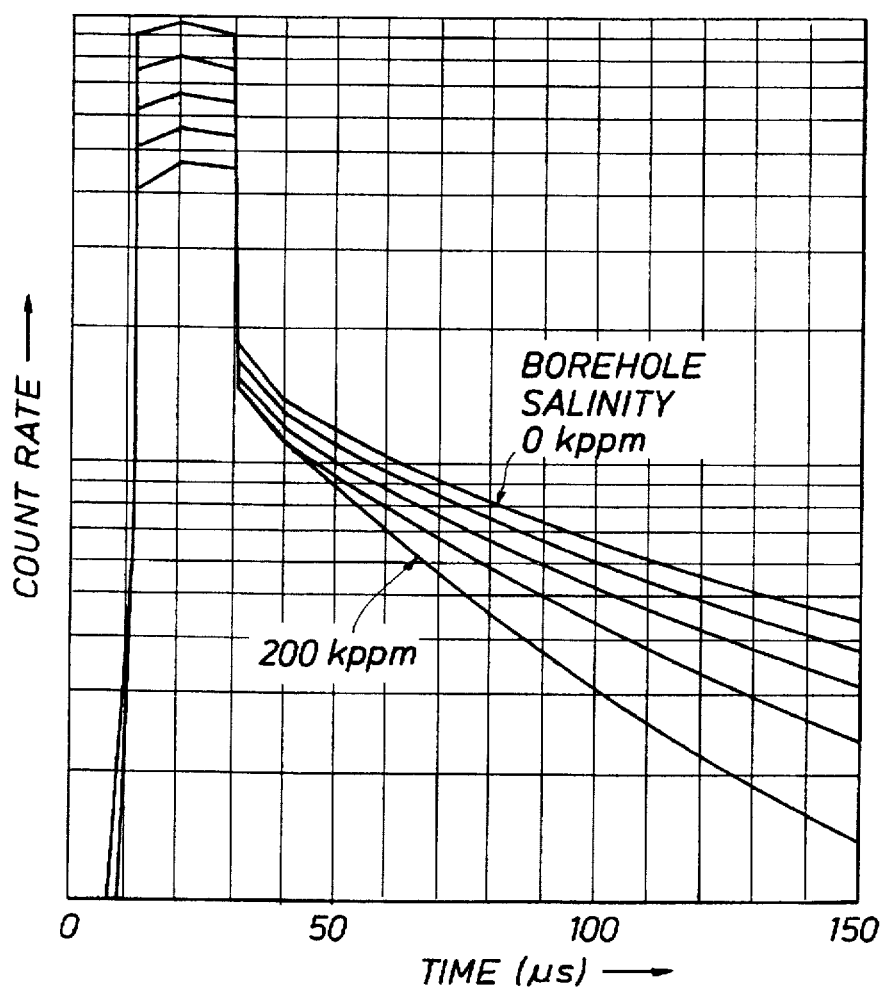
FIG. 5 is a diagram of the short burst time-decay spectrum for the near detector.
Figure 6:
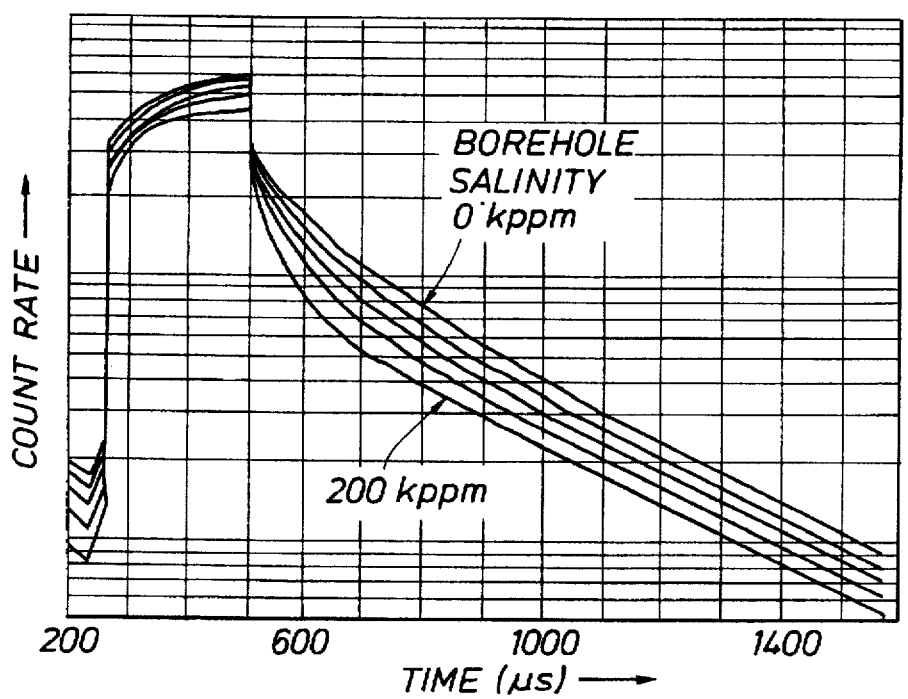
FIG. 6 is a diagram of the long burst time-decay spectrum for the far detector.

FIGS. 5 and 6 show typical "early gate" and "late gate" portions of the near and far detector Dual-Burst time-decay spectra from which SBNA and SFFA are derived. Note how the optimized Dual-Burst timing enhances the contrast between borehole and formation decays: the near-detector early gate decays following the short burst show noticeably different slopes directly corresponding to different borehole fluid salinities. In contrast, the far-detector late gate decays following the long burst are nearly parallel to one another (i.e., have nearly identical slopes) and thus respond almost entirely to the formation. Referring to FIG. 4, SBNA is proportional to the inverse of the "slope" of the near detector decay-curve 25. Similarly, SFFA is proportional to the inverse of the "slope" of the far detector decay-curve 26. The apparent decay times ($\tau$) are calculated using a robust moments method as described in U.S. Pat. No. 4,600,838 (Steinman et al., Jul. 15, 1986) or U.S. Pat. No. 5,420,422 (Loomis, May 30, 1995). The apparent capture ratio (TRAT) is obtained in the late gate region by dividing the corrected counting rate of the near detector by that of the far detector.

The main step in this invention is step 3. This step provides the transforms and environmental corrections to convert the set of observed (apparent) quantities such as SBNA, TRAT, and SFFA into the salinity of the borehole fluid (BSAL), formation porosity (TPHI) and formation capture cross section (SFFC). Stated mathematically, the corrected quantities BSAL, TPHI and SFFC are multidimensional functions of the apparent quantities (SBNA, TRAT, SFFA), previously determined corrected quantities, the lithology and the borehole completion as shown below:

$$\text{BSAL (SBNA, TRAT}^2\text{, SFFA, CID, T}_{cag}, \text{T}_{cem}, \text{Lith)} \quad (7)$$

$$\text{TPHI (TRAT, TRAT}^2\text{, BSAL, SFFA, CID, T}_{cag}, \text{T}_{cem}, \text{Lith)} \quad (8)$$

SFFC (SFFA, TPHI, BSAL, CID, $T_{csg}$, $T_{cem}$, Lith)     (9)

where CID is the casing inside diameter, $T_{csg}$ is the thickness of the casing, $T_{cem}$ is the thickness of the cement, and Lith is the formation lithology. As an example, the determination of SFFC has over 1000 database points describing its response. Generalizing, for any arbitrary point in a given lithology, a local expansion (parametrization) of SFFC can be made as a low-order function of each independent variable as:

$$SFFC = b_0{}^S + b_1{}^S SFFA + b_2{}^S TPHI + b_3{}^S BSAL + b_4{}^S CID + b_5{}^S T_{csg} + b_{cas}{}^S T_{cem},  \quad (10)$$

where $b_0$ is an intercept and the remaining b's are the derivatives of SFFC with respect to each of the parameters at this arbitrary point. BSAL and TPHI are computed first and input to the SFFC computation as depicted in equations 7, 8 and 9. Expansions of BSAL and TPHI are similar:

$$BSAL = b_0{}^B + b_1{}^B SBNA + b_2{}^B TRAT + b_3{}^B SFFA + b_4{}^B CID + b_5{}^B T_{csg} + b_6{}^B T_{cem},  \quad (11)$$

$$TPHI = b_0{}^T + b_1{}^T TRAT + b_2{}^T TRAT^2 + b_4{}^T BSAL + b_5{}^T SFFA + b_5{}^T CID + b_6{}^T T_{csg} + b^T T_{cem}  \quad (12)$$

As seen, expansions along most dimensions are linear with no term higher than order two. However, the method is not restricted to such low order expansions.

Given the large size of the database, there is an overdetermined set of many hundred equations with only a half-dozen or so unknowns (the b's). The b's are obtained through a classical "Weighted Multiple Linear Regression" (WMLR) technique where using the SFFC example above, the dependent (response) variables are defined as SFFC and the independent (regression) variables as SFFA, TPHI, BSAL, CID, $T_{csg}$, and $T_{cem}$ for a given lithology. The key to the WMLR method is assignment of an appropriate weight to each of the measured database points to weight heavily those points closest to the measured data-point and weight lightly those distant points. This method effectively uses the "nearest neighbors" to determine the local parametdzation. Stated another way, at every depth level the sequence of regressions (equations 10, 11, 12) is performed using all lithology-matching database points, but each point is weighted according to its proximity to the current depth level measurement. The weights and, subsequently the b's are computed at every depth level, then the b's are used to compute BSAL, TPHI and SFFC (equations 10, 11, 12), and then the b's are discarried (i.e. the next level does not "remember" the previous level). The final sigma (SIGM) is alpha-processed from SFFA and SFFC to improve precision as described in U.S. Pat. No. 4,909,075 (Flaum et al., Mar. 20, 1990). The term "SIGM" will be used hereafter to denote the corrected sigma.

For quality control, a second estimate of formation Σ, SFNC, is made by replacing SFFA with its near-detector analog SFNA. The difference between SFNC and SFFC (called DSIG for "delta sigma") is used as a quality indicator. A good match between SFNC and SFFC (DSIG=0) provides confidence that the environmental parameters (CID, $T_{csg}$, $T_{cem}$, Lith) represent the actual well bore conditions encountered during logging. The departure of SFNC from SFFC suggests that actual environmental conditions may not match the environmental parameters input to the algorithm. Such effects may be caused by washouts, eccentered casings, cement anomalies, dual casings or tubing, or other uncharacterized conditions. With the DSIG measurement, this method points out, for the first time, areas where there may be near-wellbore anomalies that may affect the measurement.

The salinity of the borehole fluid mixture (BSAL) is adaptively filtered. This provides substantial filtering (typically 25 feet) in areas where the borehole environment is not changing, while shrinking to as narrow as 1.5 feet to preserve the sharpness of significant transitions such as those encountered at borehole oil/water interfaces, packers, etc.

There are several advantages to the dynamic parametrization method over the prior fixed coefficient method, but perhaps the most significant, in addition to accuracy is robustness (well-behaved nature). This comes about primarily since only low-order correction/transformation functions are needed, typically linear or at most quadratic. This feature provides physically reasonable behavior when extrapolating outside the database range (high order expansions often become very unstable outside of the database range). Another advantage is that additional database points can be added without the need to redetermine and retest the entire global (fixed coefficients) parametrization to properly include the new database points. Also, the calculation of statistical uncertainties (standard deviations) becomes very straightforward. Starting with equation (1) the variance of Y (square of standard deviation) follows as simply:

$$\sigma^2_Y = b^2_1 \sigma^2_{x1} + \ldots + b^2_k \sigma^2_{xk}  \quad (13)$$

where $\sigma^2_{x1}$ is the variance of the independent quantities. The method of the present invention outputs uncertainties for all primary outputs and many apparent quantities as well.

The method optionally allows the input of external knowledge (porosity, borehole salinity, or even both) when available. When this option is chosen the corresponding WMLR's are bypassed, thereby improving both accuracy and precision of SIGM. This is particularly valuable in time-lapse monitoring applications, where the emphasis lies in finding differences between logs run in the same well one or more years apart. Finally, the dynamic parametdzation method is not iterative and does not require any convergence criteria or multidimensional Chi-square convergence surfaces such as required by dual-exponential models. This results in a much more robust and more accurate answer.

Figure 7:
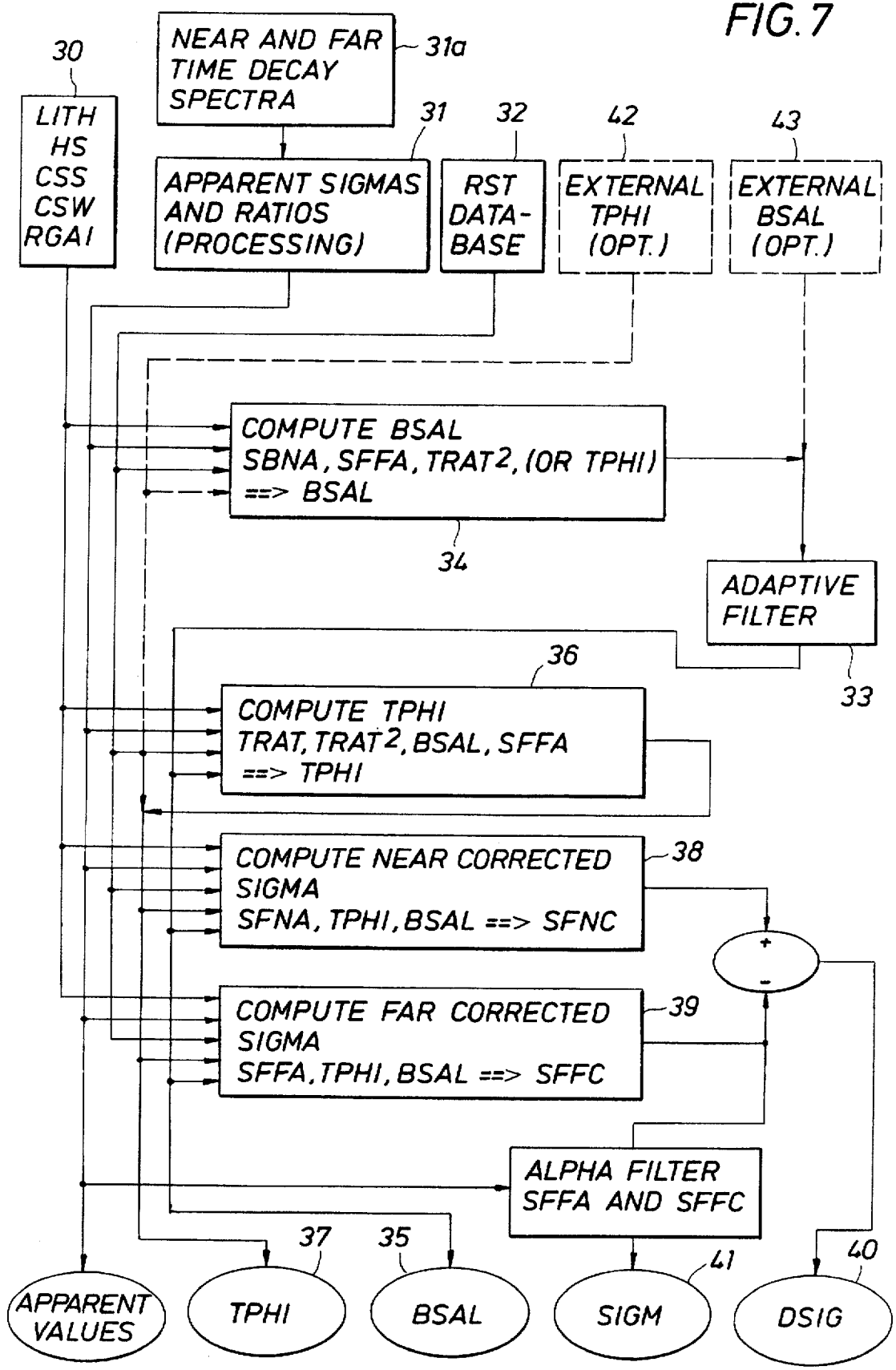
FIG. 7 is a flow diagram of the preferred embodiment of the sigma processing algorithm.

FIG. 7 shows the diagram of the data-flow of the Sigma/Porosity/BSAL computation in the present invention. In the example in FIG. 7, there are actually 4 sequential WMLR's, with typically the output of one WMLR used as one input to the next. First, the three types of inputs to the sigma answer product are identified as follows:

1) The environmental parameters 30 [upper left-hand box]:

| | |
|---|---|
| LITH | Lithology (e.g., sand, lime, dolomite) |
| HS | Hole size |
| CSS | Casing size (outer diameter) |
| CSW | Casing weight (equivalent to thickness) |
| RGAI | TRAT ratio calibration constant |

2) The apparent (observed) quantities 31 [box just to the right of environmental parameters box] are derived from input spectra 31a:

| | |
|---|---|
| SBNA | Sigma borehole, near detector, apparent |
| SFNA | Sigma formation, near detector, apparent |
| SFFA | Sigma formation, far detector, apparent |
| TRAT | Near/far capture count rate ratio |

3) The database table 32 [box just to the right of apparent box]:

This table typically contains approximately 1000 rows (database measurements) by approximately 15 columns (truths, observed, and environmental parameters).

The process of the invention done at one depth level begins with the use of the WMLR 34 to compute borehole salinity (BSAL) 35 based on independent variables:

SBNA, SFFA, TRAT$^2$ (or TPHI), LITH, HS, CSS, CSW where BSAL is the dependent variable "Y" and SBNA through CSW are the independent variables "X's". In this embodiment, the BSAL output is next filtered to 33 improve precision. BSAL is passed downward and is an input to the next WMLR 36 and also output 35 directly from the algorithm. Porosity (TPHI) 37 is then computed, using the WMLR 36 based on independent variables

TRAT, TRAT$^2$, BSAL, SFFA, LITH, HS, CSS, CSW, RGAI, and then passes the porosity measurement downstream to the next WMLR 38. TPHI 37 is also output directly by the algorithm. One should note that the porosity response is quadratic with respect to TRAT and that special care must be used to compute its variance since the TRAT and TRAT$^2$ terms are not independent. The third computation of the WMLR 38 is a corrected near detector sigma (SFNC) based on

SFNA, TPHI, LITH, HS, CSS, CSW.

Lastly, the WMLR 39 computes a corrected far detector sigma (SFFC) based on independent variables

SFFA, TPHI, BSAL, LITH, HS, CSS, CSW.

After these WMLR's, SFNC and SFFC are subtracted from each other to make an output (DSIG) 40 which shows how well the near and far corrected sigmas match. DSIG is useful for log quality control. SFFA and SFFC are alpha-filtered to provide a final output (SIGM) 41 with the accuracy of SFFC and the precision of SFFA.

Also in FIG. 7 are two optional inputs: External TPHI (porosity) 42 and External BSAL (borehole salinity) 43. These options permit external knowledge to be used within the sigma algorithm when such knowledge is available. This capability was not available with prior methodologies. For example, if the user knows the correct value of BSAL, it can be input externally. This ability will cause the BSAL WMLR (34) to be bypassed. The process will be similar for the input of external porosity.

A series of benchmark measurements were made to assess the accuracy of the algorithm in computing BSAL, TPHI, and SIGM. A 1000+ point database was reprocessed with the dynamic parametrization algorithm and the resulting values of BSAL, TPHI, and SIGM compared with the assigned (true) database values. For this data set the average absolute errors (absolute difference between tool reading and assigned database value) are 0.22 c.u. for SIGM, 0.9 p.u. for TPHI, and 5.5 kppm for BSAL.

During the life of a PNC monitoring program, the salinity of the wellbore fluid may change from year to year. Similarly, during a "log-inject-log" (LIL) operation the formation is flushed with fluids of known and differing salinities, typically one fresh and one saline. The difference in sigma between these two cases is indicative of residual hydrocarbons. In these cases, especially the LIL one, it is very important that the algorithm properly compensate for the different borehole fluids so that changes in sigma (SIGM) result solely from changes in formation cross section.

Figure 8:
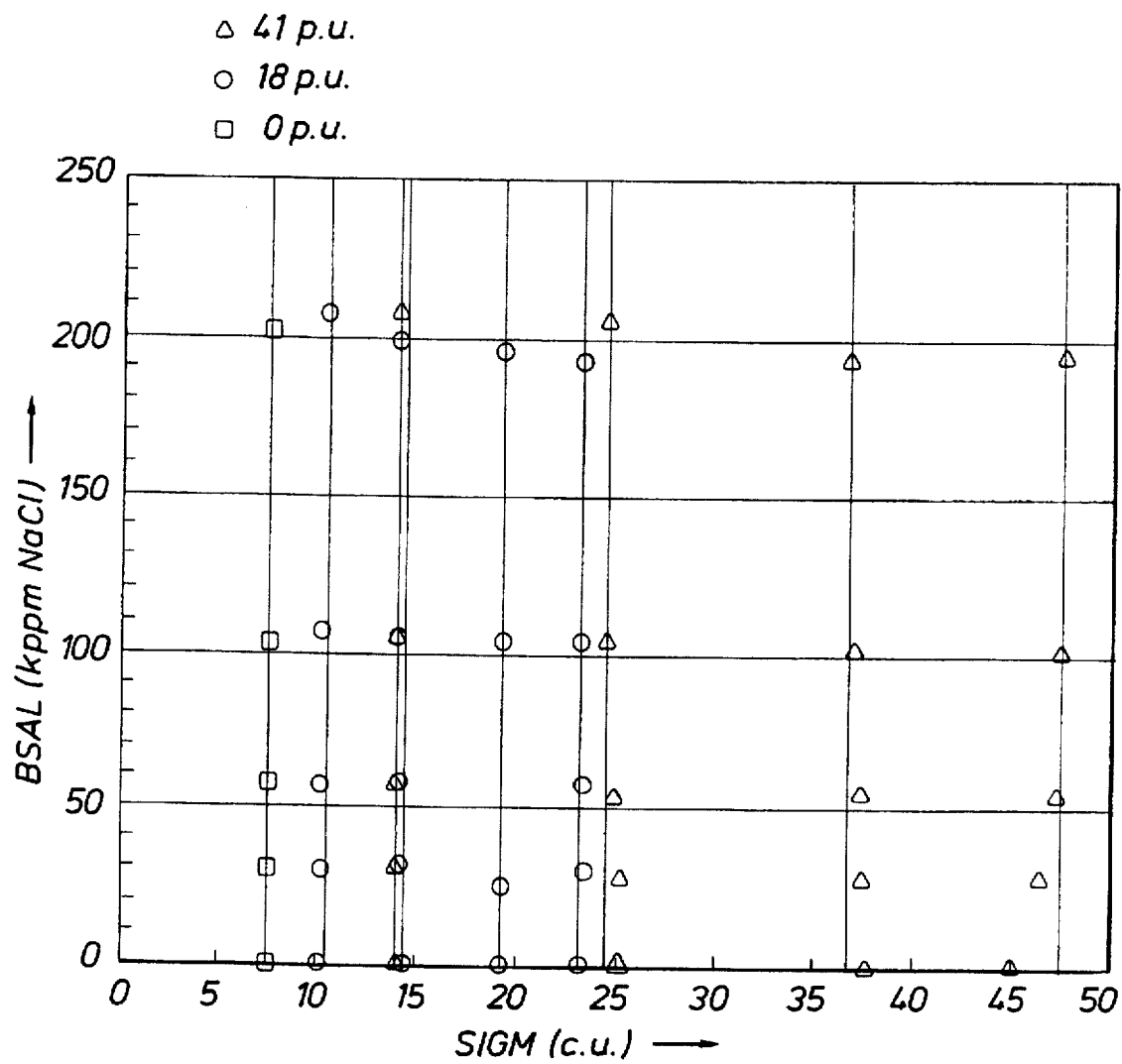
FIG. 8 is a plot of sigma and borehole salinity showing that the corrected formation sigma is independent of the borehole salinity.

FIG. 8 shows the capability of the new methodology of the present invention to properly compensate for changes in the borehole fluid. These measurements were made with the tool in three 10-inch borehole limestone formations having nominal porosities of 0, 18 and 41 p.u. Completion is 7-in. 32-lbm/ft casing. The formation flushes are normally 0, 70, 140 and 210 kppm and the borehole fluids are nominally 0, 25, 50, 100 and 200 kppm. This yields nine different formation sigmas each having five different borehole salinities ranging from fresh to saline. The vertical lines show nine formation sigmas while the symbols represent the SIGM readings for each of the five different borehole salinities. For BSAL in the 100-to-200 kppm range, note that there is very little variation in SIGM with respect to changing borehole salinity, and that this holds for nine formation sigmas spanning approximately 40 c.u. For fresher borehole salinities, the compensation is equally good for formation sigmas less that 25 c.u.

The lower right corner of the figure is the region of "cross-over" where the formation sigma approaches or exceeds that of the borehole. For example, the point in the extreme lower right corner has a formation sigma of almost 50 c.u. but borehole fluid sigma of only 22 c.u. Even in this traditionally very difficult region SIGM still reads within 5% of the true sigma (at worst). Borehole salinity compensation in smaller boreholes and casings is even better because of the smaller amount of borehole fluid present. Referring again to FIG. 8 the typical LIL areas of operation are the lower-left region (fresh formation and fresh borehole) and the upper-right region (saline formation and saline borehole), with the crossover region deliberately avoided by design. With its demonstrated compensation for borehole salinity effects, the method is very suited for LIL-type measurements.

Along with the primary measurements of sigma, porosity and borehole salinity, the WMLR in the present invention can be used to measure and provide numerous auxiliary measurements to indicate various formation and borehole properties. The WMLR technique can be used to convert the sigma, porosity and borehole salinity answers of a new tool into equivalent answers of a predecessor tool. This is accomplished in the WMLR by declaring the new tool quantities to be the independent variables and old tool quantities to be the dependent variables. This transformation is based on over 1000 laboratory measurements of the old tool under identical conditions as the new tool.

With post-processing, additional WMLR-based quantities can be provided to compute casing size, casing weight and cement thickness. Gross deviations such as washouts or incorrect casing/hole size information can be detected using these indicators along with DSIG.

Figure 9:
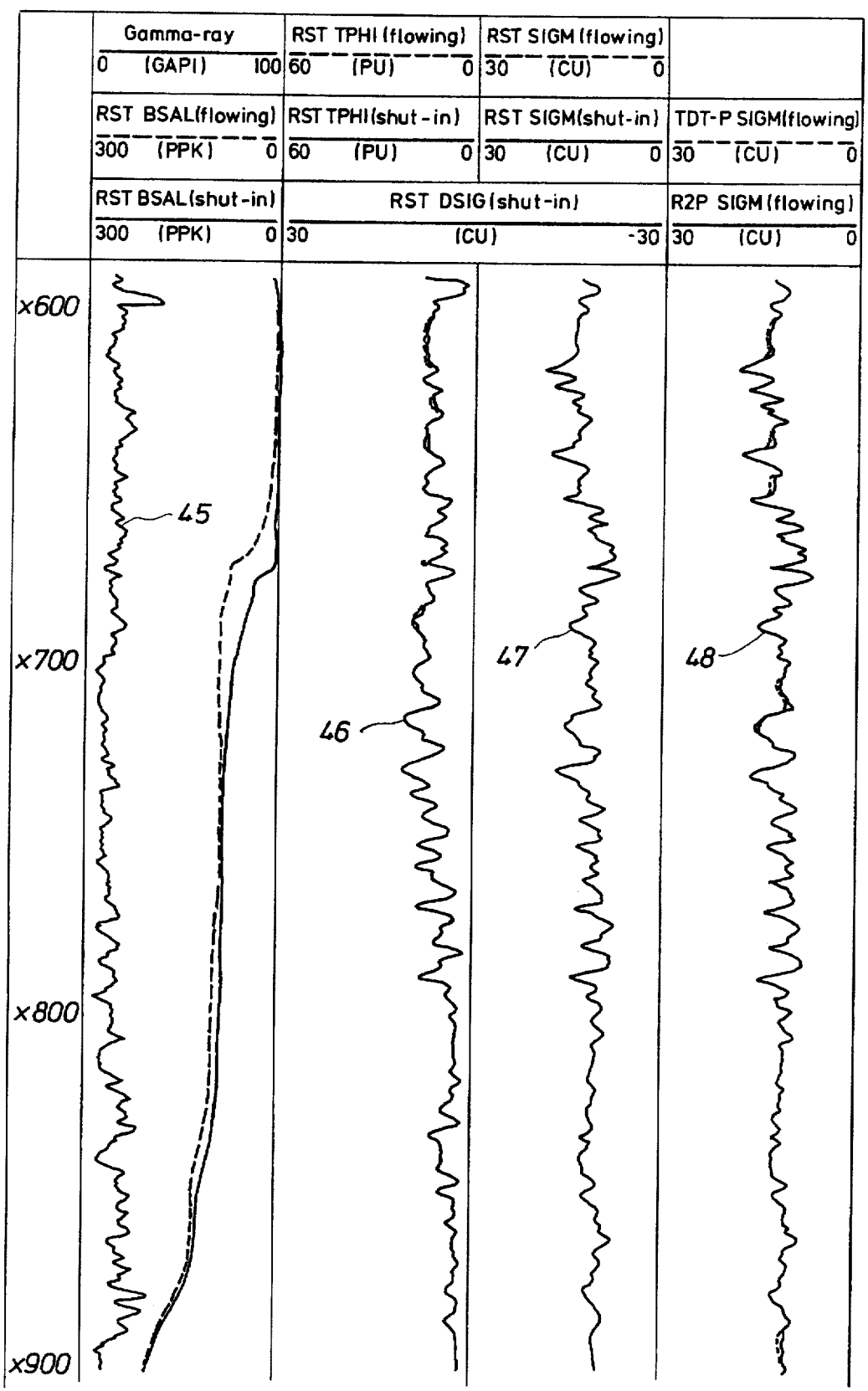
FIG. 9 is a plot of an open hole carbonate logged with RST and TDT-P tools.

Shown in FIG. 9 is a comparison of the new tool (RST) and an old tool (TDT-P) in an open hole completion with carbonate lithology under flowing and shut-in conditions. Track 3 displays flowing and shut-in passes of new tool (RST) sigma. Both curves agree extremely well. Track 48 shows old tool (TDT-P) sigma overlaid with "R2P" sigma (new tool sigma transformed to old tool sigma) under flowing conditions. Again, the curves agree very well, demonstrating capability of a smooth transition from the old to the new tool data in time-lapse applications. Statistical comparisons show that the new tool can log 2.4 times faster than the old tool in this well for the same precision (repeatability).

Spanning Tracks 46 and 47 is DSIG, the difference between near-and far detector sigmas. DSIG is nearly zero throughout the log, showing a slight positive value above x660, which suggests hole size may be slightly larger than configured in the region. This correlates with caliper data showing the hole to be slightly out of gauge above x680.

Track 46 displays porosity, both flowing and shut in. The curves compare closely throughout the porosity range encountered in this example, showing almost no difference even though flowing borehole salinity differs from shut-in salinity by up to 100 kppm near the (shut-in) oil-water contact at x674.

Track 45 shows, among other things, borehole salinity, both flowing and shut-in. Segregation of fluids is readily apparent for this open hole completion—with oil above x674, produced formation water from x674 to x830, transitioning to completion fluids below x830. The borehole salinity adaptive filter properly narrows its filter range at each fluid "boundary" and causes no disturbances in sigma or porosity answers even at the sharp oil-water contact. Note the increased flowing salinity above x674, indicating water holdup of approximately 20 percent.

Although the apparatus and method of the present invention were described in terms of a specific tool, the concepts in this invention apply to many other logging tools such as neutron porosity tools, carbon/oxygen tools and many non-nuclear tools, as well. The apparatus and method of this invention provide significant advantages over the current art. The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of the invention which is limited only by the following claims.

We claim:

1. A method of estimating an accurate response of a measurement from a logging tool positioned in a wellbore traversing an earth formation comprising the steps of:
   a) obtaining a set of raw measurements from the logging tool;
   b) correcting the raw measurement for instrumental effects;
   c) computing derived quantities from the corrected raw measurements;
   d) determining physical properties of the formation and the wellbore from the corrected raw measurements using a weighted multiple linear regression (WMLR) technique based on measured and modeled database points and corresponding weights of said database points.

2. The method of claim 1, wherein steps (a) through (d) are repeated at multiple depth levels in the formation.

3. The method of claim 1, wherein the weight in the WMLR is determined as a function of the normalized distance $d_i$ from the database point i.

4. The method of claim 1, wherein the weight (W) used in the WMLR is given as $$W_i = 2^{-2di}.$$

5. The method of claim 1 wherein the WMLR process is repeated one or more additional times in order to improve the results.

6. The method of claim 1, wherein the weight (W) used in the WMLR is given as $$W_i = d_i^{-2}$$

where $d_i$=max ($d_i$, min_distance) and min_distance is some finite fraction of the unit distance.

7. The method of claim 6, wherein the weight is changed in a binary manner such that $W_i$=1.0 if $d_i$<min-distance and $W_i$=0.0 if di >min-distance
and where min_distance is some finite normalized distance.

8. The method of claim 1, further comprising the steps of:
   e) obtaining measured and modeled database points and corresponding weights of said database points for a different logging tool;
   f) using WMLR based on measurements from said logging tool, said measured and modeled database points obtained in step (d), and said measured and modeled database points obtained in step (e) to simulate a measurement response from said different logging tool.

9. The method of claim 8, further comprising the step of:
   g) determining physical properties of said formation based on the simulated response from said different logging tool.

10. The method of claim 1, wherein the tool is a nuclear logging tool.

11. The method of claim 10, wherein step (a) comprises measuring a time decay spectrum using a pulsed neutron logging tool.

12. The method of claim 11, wherein the time decay spectra are corrected for effects of pile up and electronic dead time.

13. The method of claim 11, wherein the time decay spectra are corrected by removing the detected gamma ray background contribution.

14. The method of claim 13, wherein the background is filtered and then subtracted from the time decay spectrum.

15. The method of claim 13, wherein a ratio of near and far detector count rates (TRAT) is determined.

16. The method of claim 13, wherein apparent quantities derived from said corrected time decay spectra include a near apparent borehole sigma (SBNA) and a near apparent formation sigma (SFNA) and a far apparent formation sigma (SFFA).

17. The method of claim 16 where the borehole size, casing size and casing weight are computed in the WMLR from SFFA, SFNA, SBNA and TRAT.

18. The method of claim 16, wherein a ratio of near and far detector count rates (TRAT) is determined.

19. The method of claim 18 wherein SBNA, SFNA, SFFA and TRAT am entered in the WMLR algorithm to determine the true formation and borehole properties.

20. The method of claim 19, wherein one said property is the salinity of the borehole fluid mixture (BSAL).

21. The method of claim 20, where said salinity is filtered.

22. The method of claim 20, further comprising entering said salinity into the next WMLR to compute formation porosity (TPHI).

23. The method of claim 22 where TPHI is given as $$TPHI = b_0^T + b_1^T TRAT + b_2^T TRAT^2 + b_4^T BSAL + b_5^T SFFA + b_5^T CID + b_6^T T_{csg} + b^T T_{cem}.$$

24. The method of claim 23 wherein said salinity and porosity are entered into the WMLR computation to determine the corrected formation capture cross section SFFC from the far apparent capture cross section SFFA.

25. The method of claim 19 wherein said salinity (BSAL) has been previously determined in the process or can be represented as a function of apparent quantities and environmental parameters.

26. The method of claim 25, where salinity BSAL is represented by the equation:

$$BSAL = b_0^B + b_1^B SBNA + b_2^B TRAT + b_3^B SFFA + b_4^B CID + b_5^B T_{csg} + b_6^B T_{cem}.$$

27. The method of claim 25, wherein said salinity is entered into the WMLR computation to obtain TPHI.

28. The method of claim 27 wherein said borehole salinity (BSAL) and said porosity (TPHI) is obtained from external knowledge.

29. The method of claim 28 wherein said salinity and porosity are entered into the WMLR computation to determine corrected formation capture cross section SFNC from the near apparent formation capture cross section SFNA.

30. The method of claim 27, where SFFC is represented as $$SFFC = b_0{}^S + b_1{}^S SFFA + b_2{}^S TPHI + b_3{}^S BSAL + b_4{}^S CID + b_5{}^S T_{cas} + b_{cas}{}^S T_{cem}.$$

31. The method of claim 30, where SFFA and SFFC are alpha-filtered to provide the final formation capture cross section answer (SIGM) with the accuracy of SFFC and the precision of SFFA.

32. The method of claim 27, where SFNC is described as:

$$SFNC = b_0{}^S + b_1{}^S SFNA + b_2{}^S TPHI + b_3{}^S BSAL + b_4{}^S CID + b_5{}^S T_{cas} + b_{cas}{}^S T_{cem}.$$

33. The method of claim 32, where DSIG, the difference between SFFC and SFNC, is a quality indicator for the environmental parameters and therefore of anomalous near wellbore effects.

34. A method of estimating an accurate measurement from an instrument measuring properties of a material comprising the steps of:
   a) obtaining a set of raw measurements from the instrument;
   b) correcting the raw measurement for instrumental effects;
   c) computing derived quantities from the corrected raw measurements;
   d) determining physical properties of the material from the corrected raw measurements using a weighted multiple linear regression (WMLR) technique based on measured and modeled database points points and corresponding weights of said database points.

35. The method of claim 34, where steps (a) through (d) are repeated at different points in or on the material.

36. The method of claim 34 wherein the WMLR process is repeated one or more additional times in order to improve the results.

37. A method of estimating an accurate response of a measurement from a logging tool positioned in a wellbore traversing an earth formation comprising the steps of:
   a) obtaining a set of raw measurements from the logging tool;
   b) correcting the raw measurement for instrumental effects;
   c) computing derived quantities from the corrected raw measurements;
   d) determining physical properties of the formation and the wellbore from the corrected raw measurements using a weighted multiple linear regression (WMLR) technique based on measured and modeled database points points and corresponding weights of said database points; and
   e) repeating step (a) through (d) various depth levels in the formation.

* * * * *